United States Patent
Miwa et al.

(10) Patent No.: US 11,549,289 B2
(45) Date of Patent: Jan. 10, 2023

(54) VEHICLE DOOR STRUCTURE

(71) Applicant: TOYOTA JIDOSHA KABUSHIKI KAISHA, Aichi-ken (JP)

(72) Inventors: Takashi Miwa, Toyokawa (JP); Kento Konishi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 416 days.

(21) Appl. No.: 16/861,155

(22) Filed: Apr. 28, 2020

(65) Prior Publication Data
US 2020/0354997 A1 Nov. 12, 2020

(30) Foreign Application Priority Data
May 8, 2019 (JP) .............................. JP2019-088542

(51) Int. Cl.
| E05B 85/12 | (2014.01) |
| B60R 13/02 | (2006.01) |
| B60R 7/04 | (2006.01) |
| B60J 5/04 | (2006.01) |

(52) U.S. Cl.
CPC .............. *E05B 85/12* (2013.01); *B60J 5/0413* (2013.01); *B60R 7/046* (2013.01); *B60R 13/0243* (2013.01); *E05Y 2900/531* (2013.01)

(58) Field of Classification Search
CPC ..... E05B 85/12; B60R 13/0243; B60J 5/0413
USPC ...................................................... 296/146.7
See application file for complete search history.

(56) References Cited

U.S. PATENT DOCUMENTS

| 6,536,825 | B2 * | 3/2003 | McAndrew | B60R 11/0264 180/326 |
| 6,746,067 | B2 * | 6/2004 | Schmidt | B60K 37/06 180/326 |
| 7,265,306 | B2 * | 9/2007 | Radu | H01H 9/22 200/333 |
| 2006/0097545 | A1 * | 5/2006 | Cowelchuk | B29C 44/086 296/146.7 |
| 2019/0284847 | A1 | 9/2019 | Malvy et al. | |
| 2019/0345745 | A1 | 11/2019 | Murata et al. | |

FOREIGN PATENT DOCUMENTS

| CN | 204531745 U | 8/2015 |
| JP | 3951884 B2 | 8/2007 |

OTHER PUBLICATIONS

Office Action in CN Application No. 202010277490.5, dated Oct. 9, 2021, 11pp.
Office Action in CN Application No. 202010277490.5, dated Jul. 4, 2022, 13pp.

* cited by examiner

*Primary Examiner* — Joseph D. Pape
(74) *Attorney, Agent, or Firm* — Hauptman Ham, LLP

(57) ABSTRACT

Provided are a door trim attached on a vehicle cabin side of a vehicle door and including a storage recess curved outward in a vehicle-width direction, and a release switch disposed in the storage recess and pushed in a predetermined operating direction to output a latch release signal to an actuator that moves a latch member. The latch switch is completely stored in the storage recess, and the operating direction is tilted toward the rear of the vehicle relative to an axis extending outward in the vehicle-width direction.

6 Claims, 7 Drawing Sheets

VEHICLE DOOR STRUCTURE

CROSS REFERENCE TO RELATED APPLICATION

This application claims priority to Japanese Patent Application No. 2019-088542 filed on May 8, 2019, which is incorporated herein by reference in its entirety including the specification, claims, drawings, and abstract.

TECHNICAL FIELD

The present disclosure relates to a vehicle door structure including a door trim attached on a vehicle cabin side of a vehicle door, and a release switch provided in the door trim and releasing a latch of the vehicle door.

BACKGROUND

Usually, a vehicle door is latched to a vehicle body to prevent unintended opening of the vehicle door. To release the latch, a handle, which is a so-called inside handle (a release lever), is provided. When it is desired to open the vehicle door, a user pulls the inside handle inward into the vehicle cabin to release the latch.

In recent years, a release switch capable of pushing and releasing the latch has been proposed to be provided on the vehicle door in place of, or in addition to, the inside handle. For example, Patent Literature 1 discloses a release means provided inside the door for releasing a locked state between a door main body and a body, and an input means (release switch) provided on the inner surface of the door for remotely controlling the release means.

CITATION LIST

PATENT LITERATURE 1: JP3951884 B

SUMMARY

Arrangement of the release switch, however, has not been sufficiently considered in the conventional technique. For example, in PATENT LITERATURE 1, the input means (release switch) is provide on the surface of an assist grip and the input means (release switch) protrudes into and is exposed to the interior of the vehicle cabin. When the input means (release switch) protrudes into the vehicle cabin, baggage or a part of the body of an occupant of the vehicle may unintentionally interfere with the switch and release the latch of the vehicle door against the intention of the occupant.

The present specification, therefore, discloses a vehicle door structure including a release switch provided on a door trim, and releasing a latch to effectively prevent unintended release of the latch.

A vehicle door structure disclosed in the present specification includes a door trim attached on a vehicle cabin side of a vehicle door and including a storage recess curved outward in a vehicle-width direction, and a release switch disposed in the storage recess and pushed in a predetermined operating direction to output a latch release signal to an actuator that moves a latch member of the vehicle door. The release switch is completely stored in the storage recess, and the operating direction is tilted toward the rear of the vehicle relative to an axis extending outward in a vehicle width direction.

With this structure, it is less likely for baggage or a part of the body of the occupant of the vehicle in the vehicle cabin to hit the release switch. The release switch hardly receives a force, when hit, in the operating direction, so that the unintended pushing of the release switch can be effectively prevented. As a result, the unintended release of the latch is effectively prevented.

The release switch has an operation surface which is pushed by a user. The operating direction may be tilted toward the rear of the vehicle relative to a direction perpendicular to the operation surface.

With this structure, the occupant of the vehicle can push with a sense similar to the sense of pushing the operation surface outward in the vehicle-width direction. Accordingly, the pushing operation of the release switch and the opening operation of the vehicle door can be carried out continuously, and improved operability in opening the vehicle door is achieved.

In addition, it may also be possible to provide a release lever disposed in the storage recess and swinging inward in the vehicle cabin to release the latch of the vehicle door.

By disposing two operation elements in the same storage recess to release the latch, the operation elements used can be switched easily.

In this case, the release switch is fixedly disposed in the storage recess, and may be left in the storage recess even when the release lever swings.

Providing the release switch fixedly without displacement generates nearly no tightening/loosening of a signal line that electrically connects the release switch to the actuator. This results in eliminating a mechanism for preventing cutting or entangling of the signal line and achieves a more compact structure.

The release lever has an access hole penetrating through the release lever in the vehicle-width direction, so that the operation surface to be pushed by the user of the release switch may be exposed to the interior of the vehicle through the access hole.

This structure decreases the possibility of the release switch being hit by baggage or a part of the body of the occupant of the vehicle larger than the access hole, thus effectively preventing an erroneous operation of the release switch.

Furthermore, the release switch is mechanically connected to the release lever, and the release switch may swing by interlocking with the swing of the release lever.

This structure improves a degree of freedom of design of the release lever.

In this case, the release switch may include a knob held by the occupant of the vehicle to swing the release lever.

With this structure, it is only necessary to access the release switch when either the release switch or the release lever is operated. Accordingly, the occupant of the vehicle can immediately recognize the presence of an alternative means of the release switch (i.e., release lever), and can more easily release the latch and open the door.

According to the vehicle door structure disclosed in the present specification, the unintended release of the latch is effectively prevented.

BRIEF DESCRIPTION OF DRAWINGS

Embodiment of the present disclosure will be described based on the following figures, wherein.

DESCRIPTION OF EMBODIMENT

Figure 1:
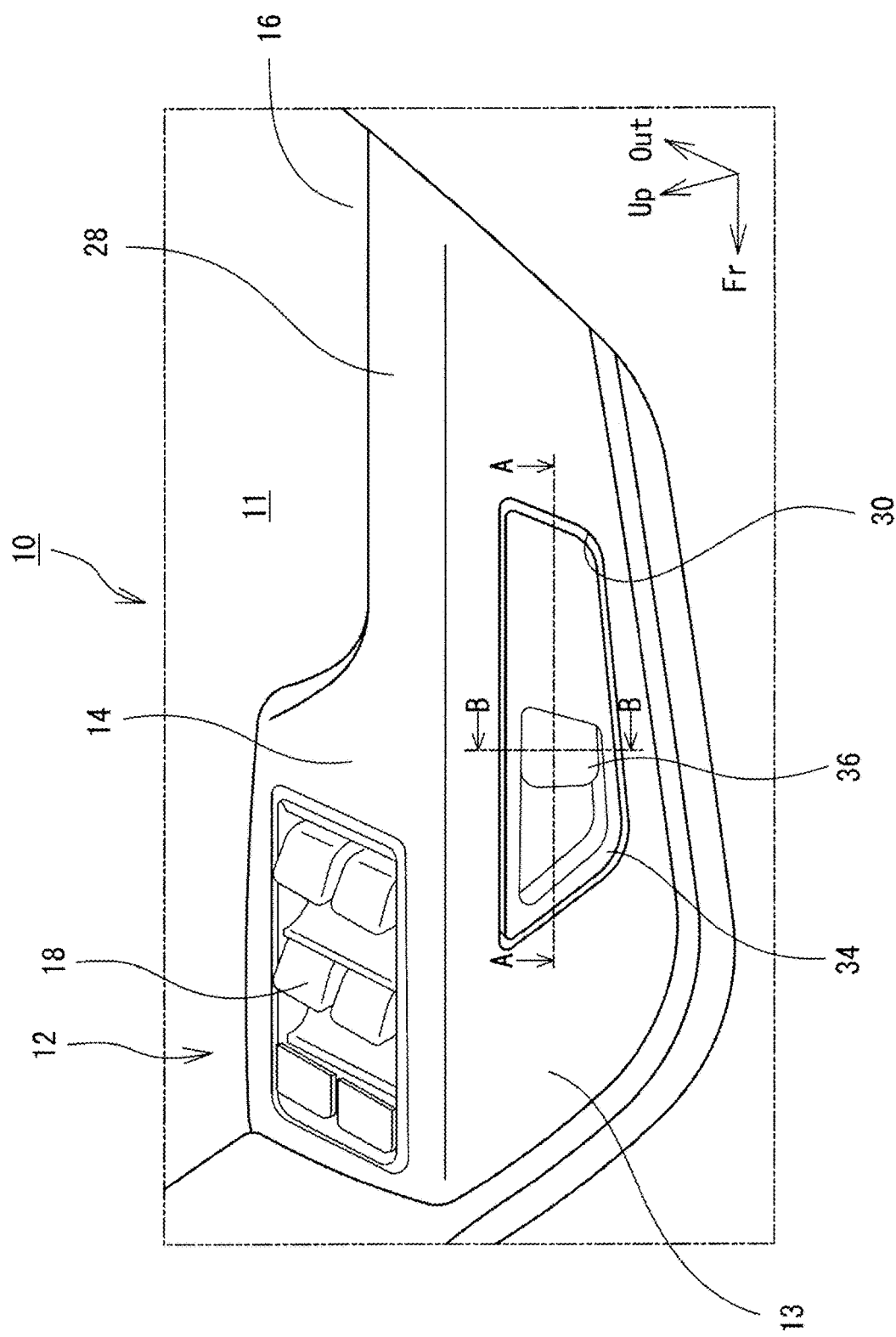
FIG. 1 is a perspective view of a vehicle door when viewed from a vehicle cabin side.
Figure 2:
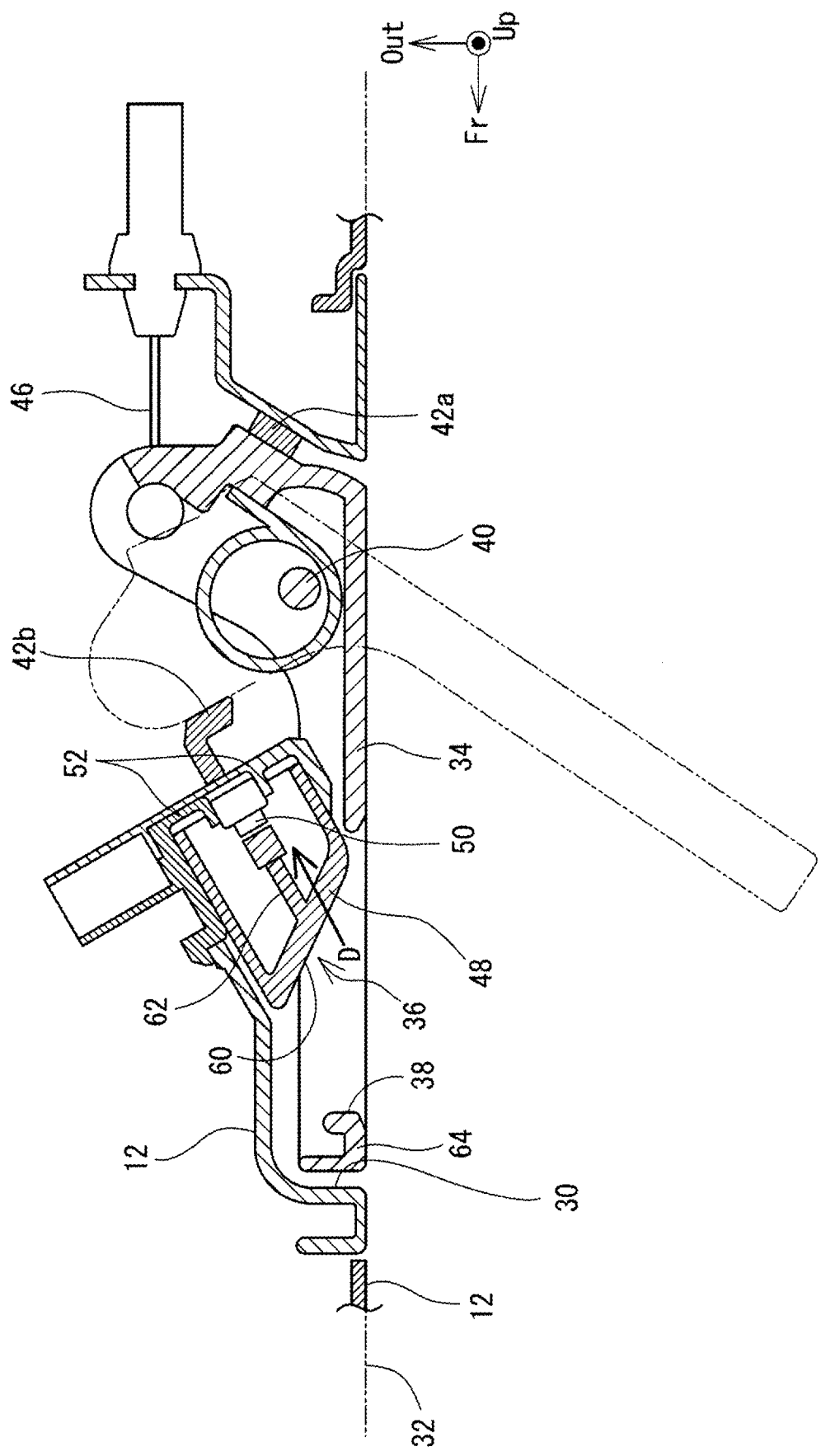
FIG. 2 is a cross-sectional view taken along line A-A of FIG. 1.
Figure 3:
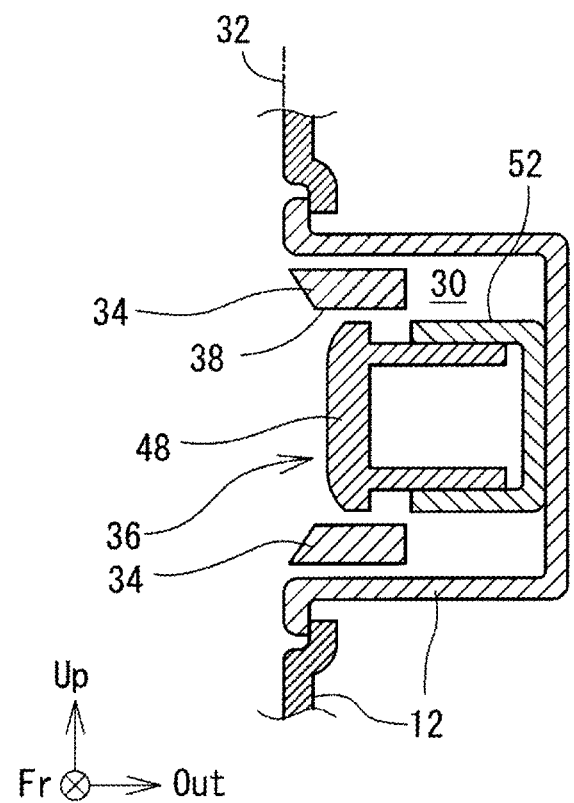
FIG. 3 is an end view taken along line B-B of FIG. 1.
Figure 4:
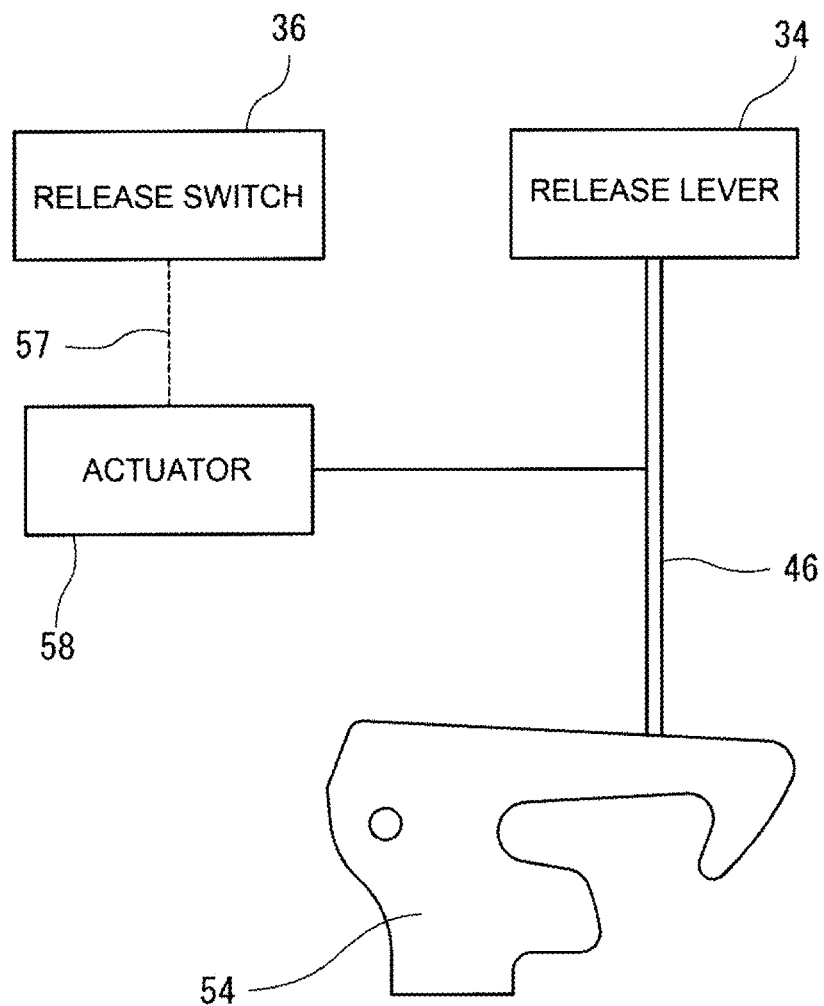
FIG. 4 is a block diagram of a latch mechanism mounted on a vehicle door.

A vehicle door structure will be described below with reference to the accompanying drawings. FIG. 1 is a perspective view of a vehicle door 10 when viewed from a vehicle cabin side. FIG. 2 is a cross-sectional view taken along line A-A of FIG. 1, and FIG. 3 is an end view taken along line B-B of FIG. 1. Furthermore, FIG. 4 is a block diagram of a latch mechanism mounted on the vehicle door 10. Note that the terms "Fr", "Up", and "Out" shown in each of the drawings represent the front of the vehicle, the top of the vehicle, and the external side in the width direction of the vehicle, respectively.

The vehicle door 10 is provided on either side of a car and covers an opening of the side of the vehicle in such a manner as to freely open and close the opening. A front end of the vehicle door 10 is connected to a vehicle body via a hinge (not illustrated), and the vehicle door 10 can swing about the hinge. Provided at a rear end of the vehicle door 10 is a latch member 54 (see FIG. 4) that engages with a striker (not illustrated) to regulate opening of the vehicle door 10. The engagement of the latch member 54 and the striker is released by operating a release switch 36 or a release lever 34, which will be described later. A lock mechanism (not illustrated) that restricts the movement of the latch member 54 is also provided near the latch member 54, so that the latch cannot be released by operating the release switch 36 and the release lever 34 when the lock mechanism is in an active state (locked state).

A door trim 12 is attached to a vehicle cabin side of the vehicle door 10. The door trim 12 is a design panel made of resin with its shape changeable appropriately in accordance with a desired interior design. In addition, the door trim 12 may be formed of a single panel member or a combination of a plurality of panel members. In the present embodiment, the door trim 12 includes a reference surface 11 configured as an inner side of the vehicle door 10 in the vehicle-width direction and a bulge portion 13 bulging inward from the reference surface 11 in the vehicle-width direction. The upper surface of the bulge portion 13 is located relatively higher than the waist portion of the occupant of the vehicle when they are seated, so that the upper surface can function as an arm rest portion 14 for putting the arm of the occupant thereon. A switch unit 18 including a plurality of operation switches is provided near the front end of the arm rest portion 14. The switch unit 18 includes, for example, a door lock switch for switching the lock mechanism, a power window switch for up-down control of a side window, and the like.

A door pocket 16 is formed by downward curving at the rear portion of the switch unit 18 of the arm rest portion 14. A portion between the door pocket 16 and the side surface of the bulge portion 13 has a width suitable for gripping easily by a human hand, so that this portion can function as a grip portion 28 capable of being gripped by the occupant of the vehicle during opening/closing the vehicle door 10.

A storage recess 30 is formed at the side surface of the bulge portion 13 by outward curving in the vehicle-width direction. In the present embodiment, the release lever 34 and the release switch 36 which are operated in releasing the latch of the vehicle door 10 are provided in the storage recess 30. The shape of the storage recess 30 can change appropriately in accordance with the shape of the operation switch and the operation lever. In the present embodiment, the storage recess 30 is substantially rectangular or substantial trapezoidal, and is elongated in a vehicle front-rear direction.

The release lever 34 is a lever for releasing the latch of the vehicle door 10 and is a so-called "interior door handle". As illustrated in FIG. 2, the release lever 34 is an elongated lever extending in the vehicle front-rear direction, with a swinging axis 40, which extends vertically, disposed near the rear end of the elongated lever. The release lever 34 can swing about the swinging axis 40. In addition, the release lever 34 is mechanically connected to a latch member 54 via a transmission wire 46. The release lever 34 swings with its front end moving inward in the vehicle-width direction to move the latch member 54 in a direction releasing the engagement between the latch member 54 and the striker, thus releasing the latch. In the storage recess 30, two stoppers 42a and 42b for defining a swinging range of the release lever 34 are provided.

Here, as is apparent from FIG. 2, the inner end surface of the release lever 34 in the vehicle-width direction smoothly continues to a surface of the door trim 12 (hereinafter referred to as a "general surface 32") of the door trim 12 around the periphery of the storage recess 30. In other words, the inner end surface of the release lever 34 in the vehicle-width direction is located in the same plane as the general surface 32 of the door trim 12, and the release lever 34 is completely stored in the storage recess 30 without protruding outward from the storage recess 30. Such a structure improves a sense of unity of the release lever 34 and the door trim 12, and achieves a polished aesthetic design.

The release lever 34 has an access hole 38 that extends in a penetrating manner in the vehicle-width direction. The shape and size of the access hole 38 are not particularly limited, but may be in a size allowing the fingers of the occupant of the vehicle to pass through, but not wrist. The front edge of the access hole 38 functions as a tab 64 on which the tip of the finger of the occupant can be hooked. When operating the release lever 34 to release the latch, the occupant hooks the tip of the finger on the tab 64 and pulls the tab 64 inward in the vehicle-width direction. Accordingly, the release lever 34 swings about the swinging axis 40 to release the latch.

The release switch 36 is provided inside the storage recess 30 and on the outer side of the access hole 38 in the vehicle-width direction. The release switch 36 is the switch to be operated when releasing the latch, as described above. As illustrated in FIG. 4, the release switch 36 is electrically connected to an actuator 58 via a signal line 57. When pushed in a predetermined operating direction, the release switch 36 outputs a release signal to the actuator 58.

Upon reception of the release signal from the release switch 36, the actuator 58 moves the latch member 54 in a direction releasing the engagement between the latch member 54 and the striker. In the present embodiment, the actuator 58 moves the latch member 54 by winding the transmission wire 46 that connects the release lever 34 to the latch member 54. The actuator 58 includes a drive source such as a motor, a solenoid, or a hydraulic cylinder. Although the actuator 58 moves the latch member 54 via the transmission wire 46 in the present embodiment, the actuator 58 may move the latch member 54 without using the transmission wire 46. Thus, the actuator 58 may be connected to the latch member 54 via a transmission mechanism such as gears, or may be connected directly to the latch member 54 mechanically. In either case, the actuator 58 is driven in response to the operation of the release switch 36, and the latch is released without operating the release lever 34.

Next, the structure of the release switch 36 will be described again. As illustrated in FIG. 2, the release switch 36 includes a switch knob 48, a push switch 50, and a switch holder 52 that holds the switch knob 48 and the push switch 50. The switch knob 48 is a substantially cylindrical member made of resin or the like. A top surface of the switch knob 48 is tilted and functions as an operation surface 60 that receives the operation of the occupant of the vehicle. A rib 62 extends from the rear surface of the operation surface 60 in an axial direction of the cylinder.

The push switch 50 is disposed at a position facing the end of the rib 62. The push switch 50 is pushed to output the release signal to the actuator 58. The signal line (not illustrated in FIG. 2) is drawn from the push switch 50 to reach the actuator 58.

The switch holder 52 has an inner diameter substantially equal to an outer diameter of the switch knob 48 and is in a substantially cylindrical shape with its top surface completely opened. In this opening of the switch holder 52, the switch knob 48 is held and can advance/retract in the axial direction. An annular rib is provided on the bottom surface of the switch holder 52 to hold the push switch 50.

The switch holder 52 is fixedly disposed in the storage recess 30, so that the release switch 36 can be left unmoved even when the release lever 34 swings. Such a non-displacable structure of the release switch 36 generates almost no tightening/loosening of the signal line, thus eliminating a mechanism for preventing cutting or entangling of the signal line, and achieves a more compact structure.

Here, as is apparent from FIG. 2, the release switch 36 is completely stored in the storage recess 30 and located on an outer side in the vehicle-width direction beyond the general surface 32 (the surface passing through the periphery of the storage recess 30). In addition, the release switch 36 is located deep within the storage recess 30 away from the release lever 34 in the vehicle-width direction, and only the periphery of the operation surface 60 is exposed in the vehicle cabin through the access hole 38. Note that the operation surface 60 is also located at an outer side in the vehicle-width direction beyond the inner end surface of the release lever 34.

As described above, the switch knob 48 can advance/retract axially and, when the switch knob 48 retracts axially, the push switch 50 is pushed. This means that the axial direction of the switch knob 48 is the operating direction D in which the release switch 36 is operated. In the present embodiment, the release switch 36 is disposed so that the operating direction D extends toward the rear of the vehicle, while extending outward in the vehicle-width direction. In addition, the operating direction D is tilted toward the rear of the vehicle relative to the direction perpendicular to the surface of the operation surface 60.

Next, the reason for the above-described arrangement is recited. The present embodiment includes the release lever 34 and the release switch 36 as the operation elements to release the latch. The release lever 34 has conventionally been adopted in numerous vehicles. However, the release lever 34 is typically configured to be pulled inward in the vehicle-width direction, that is, in a direction opposite to the direction in which the vehicle door 10 opens (to the outer side in the vehicle-width direction). Therefore, it has been necessary, in a vehicle including no release switch 36, for the occupant of the vehicle to push the vehicle door 10 outward in the vehicle-width direction after pulling the release lever 34 inward in the vehicle-width direction. Thus, the occupant has had to perform two operations in opposite directions. The release lever 34 is a mechanism for mechanically transmitting the movement of the release lever 34 to the latch member 54 via the transmission wire 46, and its operation amount (pulling amount) and operation load tend to be larger.

On the other hand, the position of the release switch 36 can be adjusted such that an operating direction D has an outward component in the vehicle-width direction to facilitate operations of pushing the release switch 36 and pushing and opening the vehicle door 10 continuously. In addition, the operation amount and the operation load of the release switch 36 need to be set such that the push switch 50 can be pushed, whereby a person who is less powerful, such as child or an elderly person, can easily operate the release switch 36.

Thus, the release switch 36 can be operated with a smaller load and a smaller operation amount than the release lever 34. However, there has been a possibility that a part of the body of the occupant of the vehicle, or baggage, may hit the release switch 36 against the intention of the occupant. To prevent such an erroneous operation, the release switch 36 of the present embodiment is completely stored in the storage recess 30. In particular, the release switch 36 of the present embodiment is disposed on the outer side in the vehicle-width direction beyond the inlet of the access hole 38 (the inner end portion of the vehicle in the width direction) so that the operation surface 60 of the release switch 36 cannot be accessed. Accordingly, it is less likely that baggage or a part of the body larger than the access hole 38 will hit the release switch 36, thus preventing the erroneous operation of the release switch 36 effectively.

Furthermore, the operating direction D of the release switch 36 is tilted toward the rear of the vehicle about the outward axis extending in the vehicle-width direction in the present embodiment. With this structure, it is very unlikely that the release switch 36 will be activated even when the baggage or a part of the body hits the release switch 36. In other words, although the baggage or the like located in the vehicle cabin may enter the storage recess 30 (or in the access hole 38, to be more precise) to hit the release switch 36, the baggage or the like typically needs to move outward in the width direction of the vehicle to enter the storage recess 30. Since the operating direction D is tilted relative to the enter movement of the baggage or the like, the unintended operation of the release switch 36 is effectively prevented.

Furthermore, as described above, in the present embodiment, the operating direction D of the release switch 36 is tilted toward the rear of the vehicle relative to the direction perpendicular to the operation surface 60. In other words, the operation surface 60 is tilted in a direction closer to the general surface 32 rather than the surface perpendicular to the operation surface 60. With such a structure, the occupant of the vehicle can push the operation surface 60 with a sense similar to the sense of pushing the operation surface 60 outward in the vehicle-width direction. In other words, the occupant can push the operation surface 60 with a sense of pushing outward in the vehicle-width direction, just like pushing and opening the door. Accordingly, this structure allows the pushing operation of the release switch 36 to be continuous from the pushing and opening operation of the vehicle door 10, thus improving the operability of opening the vehicle door 10.

Furthermore, in the present embodiment, both the release switch 36 and the release lever 34 are disposed in one storage recess 30. By placing two operation elements in the storage recess 30 to release the latch, the operation element to be used can be switched easily. For example, it would be easy to release the latch with the release switch 36 at the time of normal operation, but something might happen in the electrical system and the release switch 36 cannot be used to release the latch. In such a case, by providing the release lever 34 near the release switch 36, the occupant of the vehicle can immediately recognize the presence of the alternative means (release lever 34) of the release switch 36 and can easily release the latch and open the door.

Figure 5:
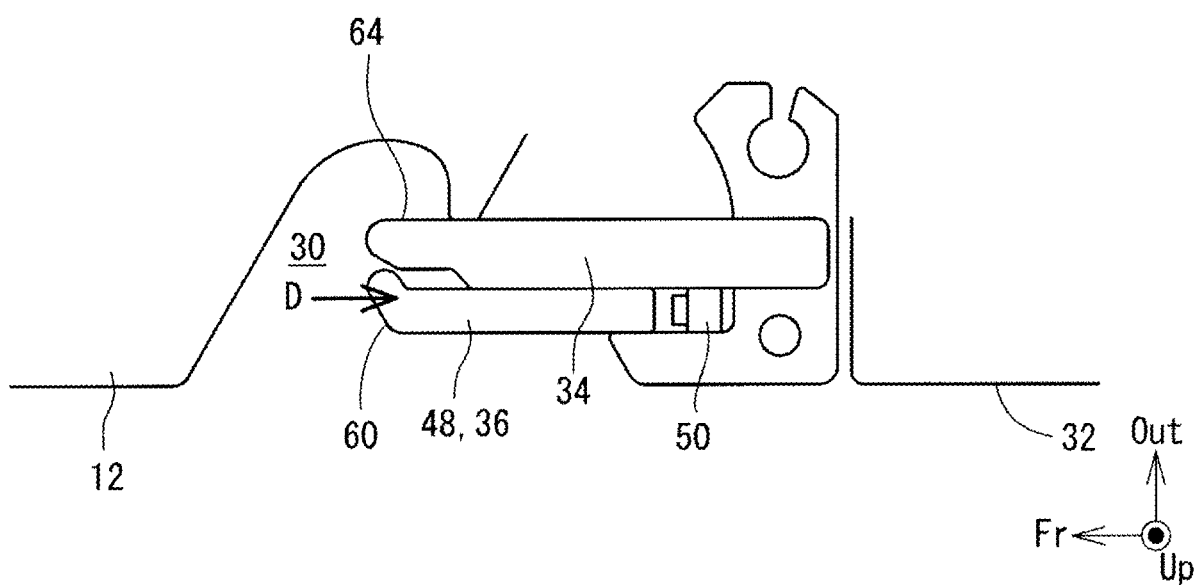
FIG. 5 is a schematic view of another example of the structure of the vehicle door.
Figure 6:
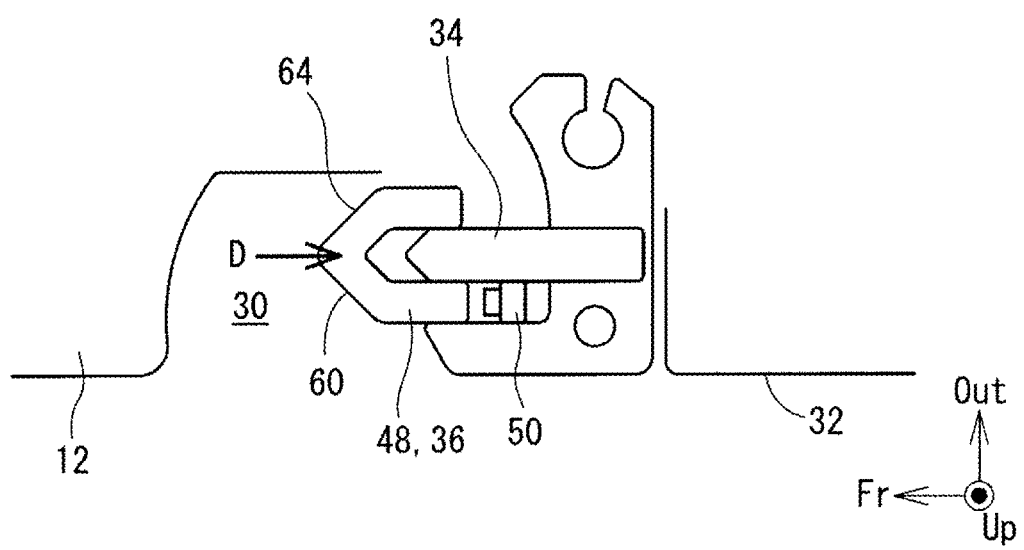
FIG. 6 is a schematic view of another example of the structure of the vehicle door.
Figure 7:
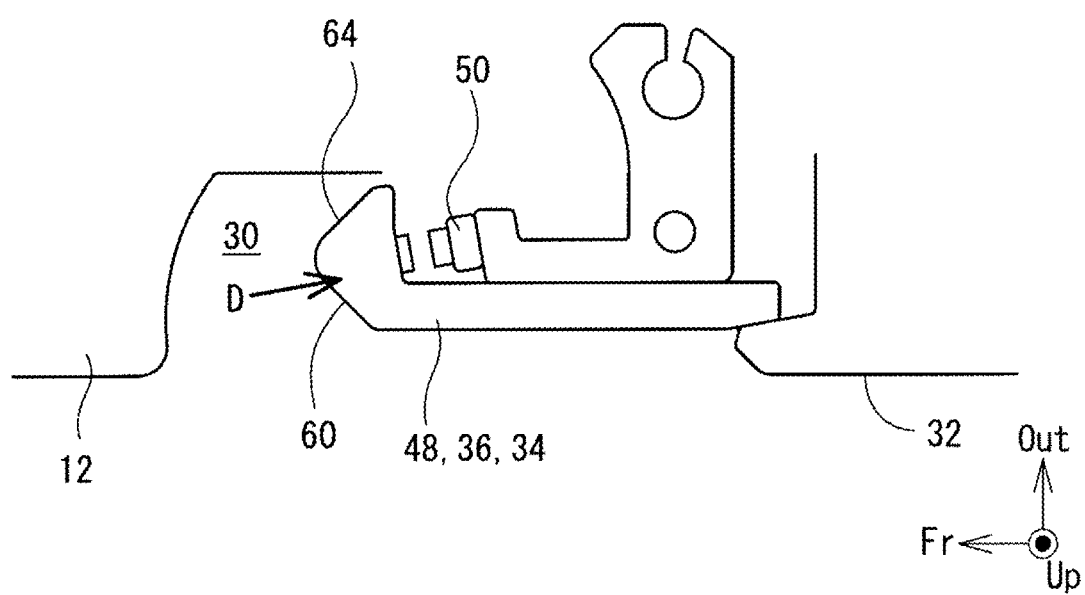
FIG. 7 is a schematic view of another example of the structure of the vehicle door.

Next, other examples of the vehicle door structure will be described with reference to FIGS. 5 to 7. FIGS. 5 to 7 are schematic views illustrating other examples of the vehicle door structure. First, the example of FIG. 5 will be described. The release switch 36 is also completely stored in the storage recess 30 in the example of FIG. 5 and disposed on the outer side in the vehicle-width direction beyond the general surface 32.

In the example of FIG. 5, however, the switch knob 48 is an elongated plate-like member extending in the vehicle front-rear direction, and the front end surface of the switch knob 5 functions as the operation surface 60 that receives the operation by the occupant of the vehicle. As illustrated in FIG. 5, the operation surface 60 is tilted so as to proceed forward as it moves to the outer side in the vehicle-width direction. The switch knob 48 is held in a manner capable of advancing/retracting in the vehicle front-rear direction, and the push switch 50 is provided behind the switch knob 48. Thus, the operating direction D of the release switch 36 is substantially parallel with the vehicle front-rear direction in the example of FIG. 5. With the operating direction D extending substantially parallel with the front-rear direction of the vehicle, the release switch 36 is more reliably prevented from being pushed incidentally, and the unintended latch release is more reliably prevented.

The release lever 34 is disposed on the outer side of the release switch 36 in the vehicle-width direction. The release lever 34 is mechanically connected to the release switch 36, and the release lever 34 swings about the swinging axis 40 to swing and displace the release switch 36 as well. This structure eliminates the need for providing the access hole 38 in the release lever 34, thus improving a degree of freedom of design of the release lever 34. In this case, a distance between the push switch 50 and the actuator 58 changes according to the swing, so that a mechanism for offsetting the tightening/loosening of the signal line 57 (e.g., a spring for energizing the signal line 57 in the tightening direction) may be provided in the middle of the signal line 57. With the release switch 36 disposed before the release lever 34, the occupant of the vehicle can more easily recognize the presence of the release switch 36, and improved operability of the release switch 36 is achieved.

Next, the example of FIG. 6 will be described. Again, the release switch 36 is completely stored in the storage recess 30 and is disposed on the outer side in the vehicle-width direction beyond the general surface 32 in the example of FIG. 6. In the example of FIG. 6, the switch knob 48 has a substantially triangular cross-section pointing toward the front of the vehicle. A groove is opened in the rear end surface of the switch knob 48, and the tip end of the release lever 34 is inserted into the groove. Therefore, the release lever 34 is also connected mechanically to the release switch 36 in the example of FIG. 6, and the release switch 36 also swings and is displaced in accordance with the swing of the release lever 34.

The switch knob 48 is held in a manner capable of advancing/retracting in the vehicle front-rear direction, and the push switch 50 is provided immediately behind the switch knob 48. Similar to the example of FIG. 5, the operating direction D of the release switch 36 is also substantially parallel with the vehicle front-rear direction in the example of FIG. 6. At the front end of the switch knob 48, the operation surface 60 which proceeds forward as it moves outward in the vehicle-width direction, and a surface which proceeds rearward as it moves outward in the vehicle-width direction, face each other. That is, in the example of FIG. 6, the operation surface 60 is tilted relative to the direction perpendicular to the operating direction D. Furthermore, in swinging the release lever 34 in the example of FIG. 6, the front end portion of the switch knob 48 is pinched with fingers and pulled inward in the vehicle-width direction. That is, in the example of FIG. 6, a part of the release switch 36 functions as the tab 64 held by the occupant of the vehicle to swing the release lever 34. With such a structure, it is possible to access substantially the same point (i.e., the tip end of the switch knob 48) even when the release switch 36 or the release lever 34 is operated. As a result, the occupant can recognize the presence of the alternative means (release lever 34) of the release switch 36 immediately, and can more easily release the latch and open the door.

Next, the example of FIG. 7 will be described. Again, in the example of FIG. 7, the release switch 36 is completely stored in the storage recess 30 and the release switch 36 is disposed on the outer side in the vehicle-width direction beyond the general surface 32. In the example of FIG. 7, the switch knob 48 also functions as the release lever 34 and can swing about the swinging axis 40. Thus, with the switch knob 48 functioning as the release lever 34, the number of parts can be reduced.

Furthermore, in the example of FIG. 7, the operating direction D of the release switch 36 extends at an angle toward the rear of the vehicle as it proceeds outward in the vehicle-width direction. The switch knob 48 is held in a manner capable of advancing/retracting in the operating direction D. The tip end portion of the switch knob 48 has a substantially triangular cross-section pointing toward the front of the vehicle. The tip end portion of the switch knob 48 functions as the tab 64 held by the occupant of the vehicle to swing the release lever 34. In addition, a part of the tip end portion functions as the operation surface 60 to be pushed during the operation of the release switch 36. Like the example of FIG. 6, the occupant of the vehicle can recognize, with this structure in the example of FIG. 7, the alternative means (release lever 34) of the release switch 36 immediately, and can more easily release the latch and open the door.

Note that the structures having been described heretofore are merely examples, and other structures may be changed appropriately so long as the release switch 36 is completely stored in the storage recess 30 and the operating direction D of the release switch 36 is tilted toward the rear of the vehicle relative to the axis extending outward in the vehicle-width direction.

REFERENCE SIGNS LIST

10 Vehicle door
11 Reference surface
12 Door trim
13 Bulge portion
14 Arm rest portion
16 Door pocket
18 Switch unit
28 Grip portion
30 Storage recess
32 General surface
34 Release lever
36 Release switch
38 Access hole
40 Swinging axis
42a, 42b Stopper
46 Transmission wire
48 Switch knob
50 Push switch
52 Switch holder
54 Latch member
57 Signal line
58 Actuator
60 Operation surface
62 Rib
64 Tab
D Operating direction

The invention claimed is:

1. A vehicle door structure, comprising:
a door trim attached on a vehicle cabin side of a vehicle door and including a storage recess curved outward in a vehicle-width direction;
a release switch disposed in the storage recess and pushed in a predetermined operating direction to output a latch release signal to an actuator that moves a latch member of the vehicle door; and
a release lever disposed in the storage recess and swinging inward in a vehicle cabin to release a latch of a vehicle, wherein
the release switch is completely stored in the storage recess, and
the predetermined operating direction is tilted toward a rear of the vehicle relative to an axis extending outward in the vehicle-width direction.

2. The vehicle door structure according to claim 1, wherein
the release switch includes an operation surface to be pushed by a user, and
the predetermined operating direction is tilted to the rear of the vehicle relative to a direction perpendicular to the operation surface.

3. The vehicle door structure according to claim 1, wherein
the release switch is fixedly disposed in the storage recess and remains in the storage recess when the release lever swings.

4. The vehicle door structure according to claim 3, wherein
the release lever includes an access hole formed penetrating through the release lever in the vehicle-width direction,
the release switch includes an operation surface to be pushed by a user, and
the operation surface of the release switch is exposed to an interior of the vehicle cabin via the access hole.

5. The vehicle door structure according to claim 1, wherein
the release switch is mechanically connected to the release lever, and the release switch also swings by interlocking with the swing of the release lever.

6. The vehicle door structure according to claim 5, wherein
the release switch includes a tab to be held by an occupant of the vehicle when the release lever swings.

* * * * *